United States Patent

Holmes et al.

[15] 3,675,883

[45] July 11, 1972

[54] ADJUSTABLE BRACKET ASSEMBLY FOR USE AS A REAR DRAWER SLIDE BRACKET AND THE LIKE

[72] Inventors: Frank Holmes, Buena Park; Henry Arias, Jr., Rowland Heights; George Read, Glendora, all of Calif.

[73] Assignee: Ajax Hardware Manufacturing Corporation, City of Industry, Calif.

[22] Filed: Sept. 17, 1970

[21] Appl. No.: 73,108

[52] U.S. Cl. ..............................248/251, 248/223, 312/343
[51] Int. Cl. ..........................................................A47b 88/00
[58] Field of Search..................248/251, 223, 224, 225, 264, 248/265, 262, 256, 259, 74 PB; 312/335, 332, 334, 348, 342, 343; 24/16 PB

[56] References Cited

UNITED STATES PATENTS

| 978,095 | 12/1910 | Willet | 248/256 |
| 3,149,811 | 9/1964 | Fremstad et al. | 248/261 X |
| 2,961,211 | 11/1960 | Emery | 248/74 |
| 3,281,198 | 10/1966 | Anderson et al. | 312/343 |
| 3,210,032 | 10/1965 | Van Slyke | 248/73 |

FOREIGN PATENTS OR APPLICATIONS

| 1,352,534 | 1/1964 | France | 248/223 |
| 90,780 | 1/1958 | Norway | 248/74 |

Primary Examiner—J. Franklin Foss
Attorney—Mahoney, Hornbaker & Schick

[57] ABSTRACT

A rear door slide supporting bracket of a bracket member is received through a mounting member opening bringing the bracket member into longitudinal slidable nesting within a mounting member longitudinal groove, the mounting member longitudinal groove and enlarged opening permitting relative longitudinal slidable adjustment of the bracket.

Both the mounting and bracket members may be formed of plastic integrally joined by a flexible strap in both dissassembled and assembled positions.

7 Claims, 9 Drawing Figures

PATENTED JUL 11 1972 3,675,883
SHEET 1 OF 2
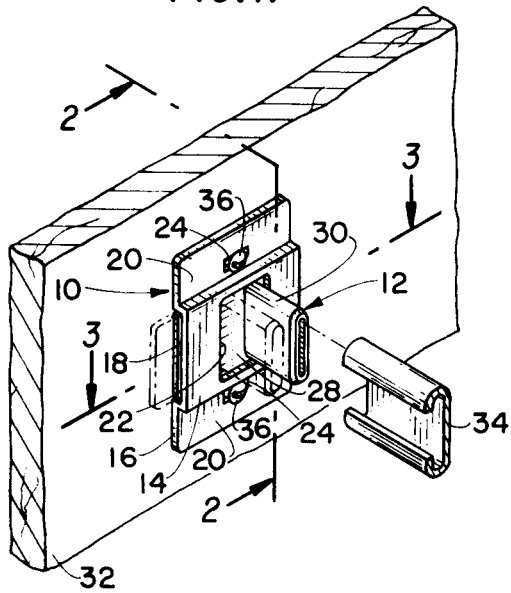
FIG. 1.
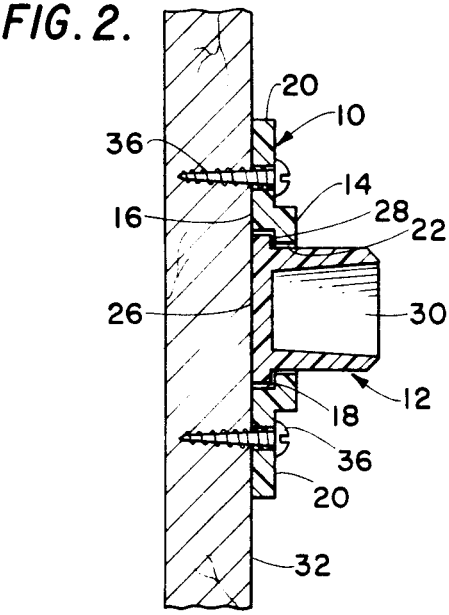
FIG. 2.
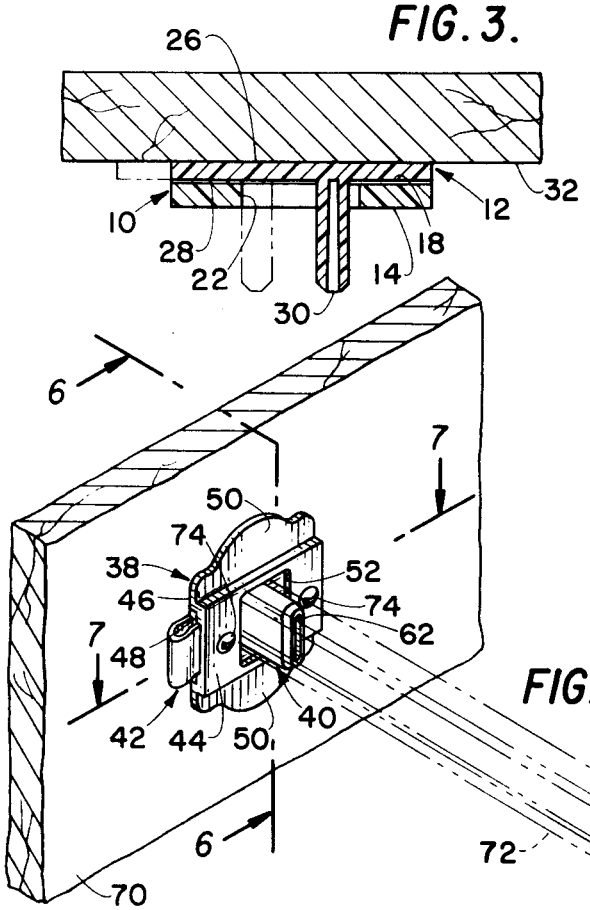
FIG. 3.
FIG. 4.
FIG. 5.
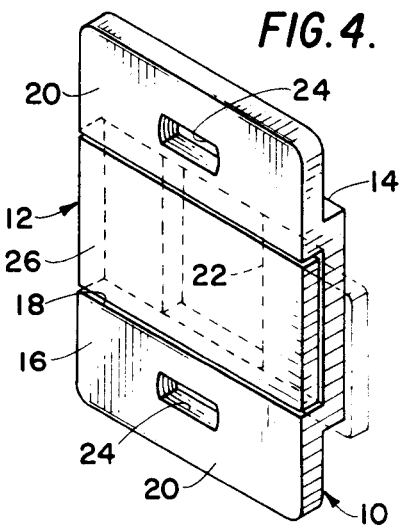
INVENTORS.
FRANK HOLMES,
HENRY ARIAS JR.,
AND GEORGE READ
BY MAHONEY, HORNBAKER
AND SCHICK
ATTORNEYS

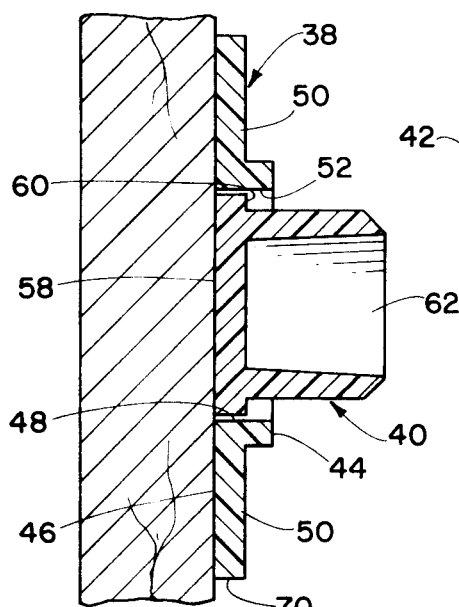
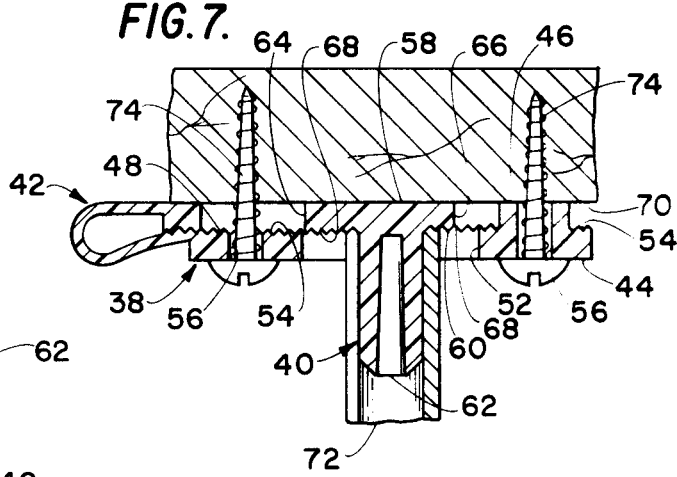
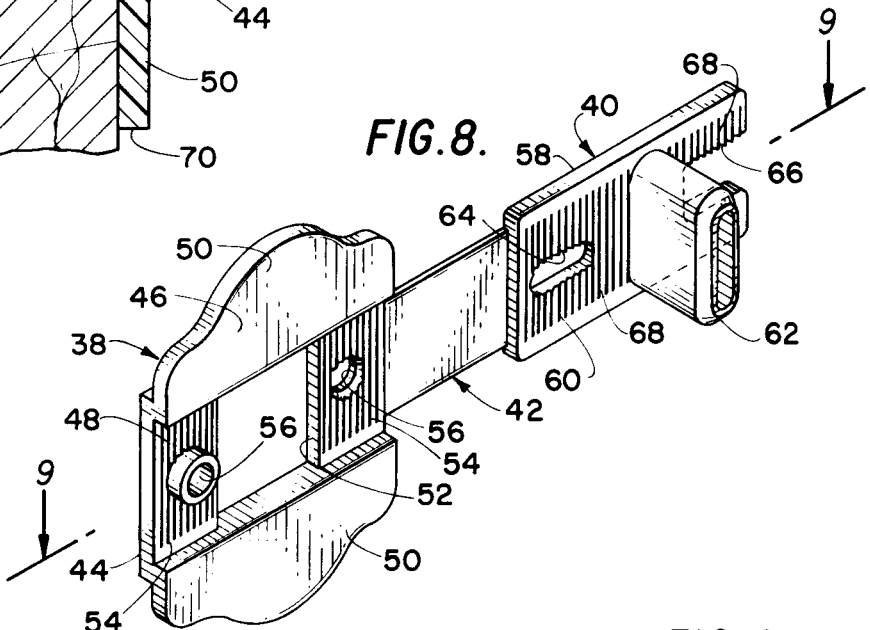
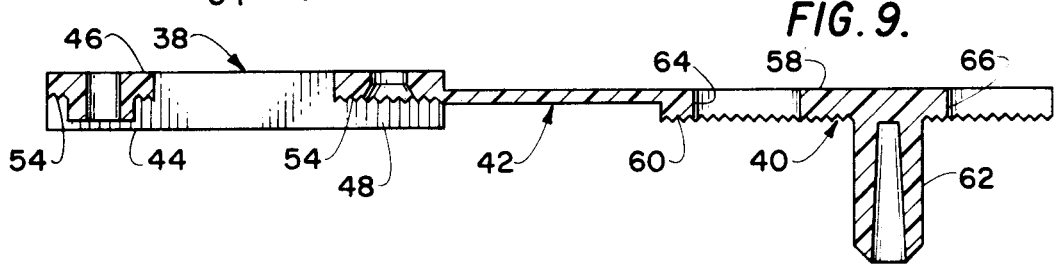

ADJUSTABLE BRACKET ASSEMBLY FOR USE AS A REAR DRAWER SLIDE BRACKET AND THE LIKE

BACKGROUND OF THE DISCLOSURE

This invention relates to an adjustable bracket assembly which may be used as a rear drawer slide bracket in finally mounted form, which assembly may include two distinct members or parts relatively slidably adjustable in a unique manner, in one form, constantly floating after final mounting, and in another form adjustable only during final mounting, of the assembly on a mounting surface in order to bring a bracket of the assembly into proper alignment for properly maintaining various forms of drawer slides and the like in functional working operation. Certain of the features of the invention are that, in the floating form, the parts of the assembly are positively retained in a constantly floating and adjusting position, while in another form, where conditions dictate, for maximum retention of final adjusted relative positioning between the parts of the assembly, such parts may be particularly formed with unique interfitting and abutting interengagement during the final assembly operation for the mounting thereof on the mounting surface so as to assure that the desired final aligned positioning between the parts of the assembly will be maintained during a long period of functional use. Furthermore, as an additional part of the present invention and where desired with either floating or finally secured forms, the entire assembly may be formed unitary, originally in a flatwise form with a flexible strap extending generally flatwise between these two distinct parts, and during assembly, the one part may be folded over the other as permitted by folding of the connecting strap to particularly assemble the two parts in the finally floating or secure adjusted form.

Most prior constructions of brackets for supporting the rear end of slides used in guiding and controlling drawers and the like have been formed of one piece, usually metal and of welded or stamped form. During mounting for use, the prior brackets are positioned on a vertical mounting surface and retained in place through the use of conventional fasteners, such as wood or metal screws. In such mounting, the fasteners are received through certain slotted openings of the bracket so that in final securement, the brackets may be adjusted relative to the mounting surface properly aligned for receiving the rear end of the drawer slide supported thereon and then finally secured stationary.

Thus, with all of the prior rear drawer slide bracket assemblies to our knowledge, it has always been attempted to securely retain the bracket in a preset, permanently adjusted position exactly aligned for receiving the rearend of the drawer slide supported thereon. Although there are certain drawer slide and related guided drawer arrangements in which permanently adjusted and maintained drawer slides are a vital requirement for proper functioning of the drawers during inward and outward movement thereof, it has been found, according to certain of the principles of the present invention, that many drawer slide and guided drawer arrangements will operate in a superior manner if the rearends of the drawer slides are mounted on a limited adjustably floating rear drawer slide bracket. In other words, with the rear end of the drawer slide mounted by a freely floating rear drawer slide bracket, it has been found that during inward and outward movement of the drawers supported by such drawer slides, the drawer slide will always seek proper alignment, even different at different inward and outward positions of the drawers, for most easily permitting free drawer inward and outward movement, while still providing sufficient guiding by the drawer slide for properly limiting such drawer movement.

Still in other drawer arrangements, however, it has been found that secure permanent, adjusted mounting of the rear drawer slide brackets is important in order that the associated drawer will function smoothly during its inward and outward movement. In such case, the exact vertical positioning of a particular drawer slide bracket most frequently does not present any substantial difficulties and can usually be readily determined prior to any insertion of fastening screws for the exact final bracket positioning. The main difficulty presented with drawer slide brackets requiring secure adjustment is the proper relative horizontal positioning, that is, shifting the brackets horizontally along the mounting surface into exact proper alignment so that the drawer being installed will not bind in its movement forwardly and rearwardly as so guided by the drawer slide being supported by the rear drawer slide bracket. Thus, the major difficulty with the prior rear drawer slide brackets finally retained in a secure position is in the adjustability thereof during installation horizontally along the mounting surface to which such brackets must be secured.

A still further important requirement of rear drawer slide brackets of this finally secured form is that once this relative horizontal adjustment thereof is obtained for proper support of the drawer slide and the proper functioning of the drawer guided by such slide, such adjusted positioning must be positively maintained. Furthermore, such adjustment must be positively maintained over a long period of relatively harsh and abusive use of the drawer and slides supported thereby. In this respect, the prior rear drawer slide brackets of the forms herein discussed have again been lacking as there have been many occasions where read-adjustments and even replacements of the brackets have been required after various periods of use.

OBJECTS AND SUMMARY OF THE INVENTION

It is, therefore, an object of this invention to provide an adjustable bracket assembly usable as a rear drawer slide bracket and the like which assembly is formed of two functionally distinct parts, one adjustable relative to the other, in one form, freely adjustably floating throughout use thereof, and in another form, only adjustable during final bracket assembly and securement to a mounting surface, but in either form, final adjusted alignment within the limits required may be obtained with a minimum of time and effort while still producing exact desired results. The unique assembly is comprised of distinct bracket and mounting members, the bracket member ultimately serving as the supporting part for the drawer slide and the mounting member overlying the bracket member and retaining the same mounted on a vertical mounting surface, in one form, freely adjustably floating, and in the other form, securely retained in exact set alignment for the drawer slide support. In the procedure for finally assembling and mounting the bracket and mounting members of the finally securely retained form, such members may be first attached to the mounting surface in a roughly aligned and loosely mounted condition and then finally exactly aligned in exact proper position followed by full tight securement by ordinary fasteners.

It is a further object of this invention to provide an adjustable bracket assembly usable as a rear drawer slide bracket and the like of the foregoing general character which may be provided, when desired, as a unitary assembly capable of original flatwise positioning as originally manufactured and provided, yet conveniently foldable into a final assembly form ready for mounting attachment to a vertical mounting surface and final adjustment for proper alignment. The overall assembly is still formed by the functionally distinct bracket and mounting members but such members are originally connected by a flatwise extending flexible strap. Thus, during final assembly, one of the members is merely folded over the other of the members into proper final assembly, the flexible strap folding upon itself to permit such final assembly and also permitting the constantly floating or final adjustment for proper alignment through the flexibility thereof.

It is also an object of this invention to provide an adjustable bracket assembly usable as a rear drawer slide bracket and the like capable of incorporating all of the foregoing advantageous constructions and functioning capabilities wherein each of the bracket and mounting members may include uniquely cooperable construction elements assuring the establishment of proper mounted alignment of the final bracket assembly for proper functioning as a floating assembly or a permanently secured assembly, depending on the form of the present invention used, and the maintenance of such properly functional alignment, without further adjustment, over a long period of use. In a preferred form of the present invention, the previously discussed assembly mounting member has an opening formed therethrough and a bracket aligning groove in the rearward surfaces thereof encompassing said opening, the bracket member in the final bracket assembly being received in this mounting member groove with a forwardly projecting bracket thereon extending forwardly through the mounting member opening. Thus, when the mounting member is assembled over the bracket member, the bracket member may be adjusted along the mounting member groove, the bracket of the bracket member moving within the mounting member opening, so as to permit the final constantly floating adjusted alignment between the members, or the final clamped adjusted alignment for the final securement of the members.

It is also preferred for optimum final adjustment retainment in the final clamped adjusted form to provide a plurality of serrations on each of the member mating abutting surfaces which interengage after final adjustment and during final securement. These serrations are formed at an angle to the direction of positioning adjustment between the mounting and bracket members so that once final adjustment is obtained and final securement takes place, the desired alignment will always be retained by these interengaged serrations in addition to the normal clamping abutment between the member surfaces and against the surface on which the assembly is mounted.

Other objects and advantages of the invention will be apparent from the following specification and the accompanying drawings which are for the purpose of illustration only.

BRIEF DESCRIPTION OF THE DRAWINGS

FIG. 1 is a fragmentary perspective view showing an embodiment of the adjustable bracket assembly of the present invention and of the constantly floating form secured to a vertical mounting surface in final properly positioned and aligned functional form;

FIG. 2 is an enlarged, fragmentary, vertical sectional view looking in the direction of the arrows 2—2 in FIG. 1;

FIG. 3 is an enlarged, fragmentary, horizontal sectional view looking in the direction of the arrows 3—3 in FIG. 1;

FIG. 4 is a rear perspective view showing the embodiment of the adjustable bracket assembly of the constantly floating form removed from the vertical mounting surface;

FIG. 5 is a fragmentary, perspective view showing an embodiment of the adjustable bracket assembly of the present invention and of the finally permanently secured form secured to a vertical mounting surface in final adjusted and aligned form;

FIG. 6 is an enlarged, fragmentary, vertical sectional view looking in the direction of the arrows 6—6 in FIG. 5;

FIG. 7 is an enlarged, fragmentary, horizontal sectional view looking in the direction of the arrows 7—7 in FIG. 5;

FIG. 8 is a perspective view showing the embodiment of the adjustable bracket assembly of the finally permanently secured form in unitary flatwise form prior to the assembly of the mounting and bracket members thereof in the finally assembled form; and FIG. 9 is a horizontal sectional view looking in the direction of the arrows 9—9 in FIG. 8.

DESCRIPTION OF THE BEST EMBODIMENTS CONTEMPLATED

Referring to the drawings, one preferred embodiment of the adjustable bracket assembly of the present invention and of the constantly floating form is illustrated in FIGS. 1 through 4, and this embodiment of the adjustable bracket assembly, as well as that embodiment to be hereinafter discussed, is specifically usable as a rear drawer slide bracket as will be hereinafter described. The embodiment of the bracket assembly of FIGS. 1 through 4 has the parts thereof preferably moulded from one of the usual plastics, such as polypropylene and includes a mounting member generally indicated at 10 and a bracket member generally indicated at 12. The mounting member 10 is formed with a forward outer surface 14 and a rearward surface 16, the rearward surface having a horizontally or longitudinally extending recess or groove 18 formed therein intermediate, preferably midway, transverse dimensions thereof and opening at the longitudinal extremities of the mounting member.

Transverse extensions 20 are formed on the mounting member 10 extending upwardly and downwardly from the intermediately formed groove 18. Furthermore, an opening 22 is formed completely through the mounting member 10 preferably transversely co-extensive with the groove 18 in the rearward surface 16 and preferably midway of the longitudinal dimensions of the mounting member and the groove longitudinal extension. The opening 22 is, therefore, both transversely and longitudinally closed and encompassed by or totally within the rearward surface groove 18, said opening preferably being rectangular in shape. Also, this results in the opening 22 being intermediate the longitudinal extension of the rearward surface groove 18 so that the rearward surface 16 preferably borders the opening at opposite longitudinal sides of the opening within the groove.

Important to this constantly floating form of the adjustable bracket assembly is the fact that all of the surfaces of the mounting member 10 at or forming the groove 18 including the rearward surface 16 are relatively smooth surfaces so that there are no appreciable obstructions within the groove which would prevent relatively free slidable, particularly longitudinally slidable, movement within such groove. Completing the construction of the mounting member 10, fastener openings 24, preferably longitudinally elongated, are formed through the mounting member transverse extensions 20 and it will be particularly noted in this embodiment that such fastener openings are solely in the mounting member transverse extensions and do not penetrate nor interfere with the groove 18 in the rearward surface 16 of the mounting member.

The bracket member 12 is preferably substantially rectangular in front or rear view, the rear view thereof being shown in FIG. 4, and is formed with a flat, smooth, rearward surface 26 and a flat, smooth, forward surface 28 with the exception of a forwardly projecting drawer slide engaging bracket 30. The drawer slide engaging bracket 30 is integral on and projects forwardly from the forward surface 28 longitudinally intermediate said forward surface and it will be noted that the longitudinal dimensions of the bracket are spaced considerably less than the longitudinal dimensions of the previously described mounting member opening 22, although the overall longitudinal dimensions of the bracket member 12 are generally the same as the overall longitudinal dimensions of the mounting member 10 and the overall transverse dimensions of the bracket member are preferably only slightly less than the transverse dimensions of the groove 18 in the mounting member rearward surface 16, the importance thereof to be hereinafter discussed. Also, the transverse dimensions of the drawer slide engaging bracket 30 on the bracket member 12 are less than, but preferably only slightly less than, the transverse dimensions of the mounting member opening 22 and, most important to this embodiment of the present invention, the thickness of, that is, the forward and rearward dimensions of, the major part of the bracket member 12 excluding the drawer slide engaging bracket 30 is slightly less than the equivalent depth dimension of the mounting member groove 18, again for purposes to be hereinafter described.

In assembly of the constantly floating form of the adjustable bracket assembly, the bracket member 12 is longitudinally slidably positioned in the rearward surface groove 18 of the mounting member 10 with the drawer slide engaging bracket 30 projecting forwardly through the mounting member opening 22. Furthermore, such assembly of the mounting and bracket members 10 and 12 is positioned with the mounting member transverse extensions 20 abutting an appropriate vertical mounting surface 32 and in general alignment of the drawer slide engaging bracket 30 of the bracket member with the rearward end of a typical drawer slide 34 as shown in FIG. 1. Typical fasteners 36 are then secured through the fastener openings 24 of the mounting member 10 firmly securing the mounting member on the mounting surface 32 generally longitudinally aligned with the drawer slide 34 and preferably relatively closely transversely aligned with the drawer slide.

Thus, the drawer slide 34 may be rearwardly engaged over the drawer slide engaging bracket 30 of the bracket member 12 and will be supported by the assembly of the mounting and bracket members 10 and 12 for, in turn, supporting a drawer (not shown) in typical manner. Furthermore, during the usual inward and outward movement of the drawer supported by the drawer slide 34, the rearward end of the drawer slide may float within limited distances at least longitudinally as determined by the confines of the mounting member opening 22 and as permitted by the forward and rearward thickness of the main portion of the bracket member 12 being less than the similar dimensions of the mounting member groove 18, as well as the smooth surfaces of the mounting member forming the groove and the flat, smooth, rearward and forward surfaces 26 and 28 of the bracket member. In this manner, all of the advantages of a freely, at least longitudinally floating drawer slide bracket assembly are provided as hereinbefore discussed in a unique, simple and positive form.

A further embodiment of the adjustable bracket assembly of the present invention in an adjustable, but permanently secured form is shown in FIGS. 5 through 9, both prior to and after assembly thereof, this adjustable bracket assembly illustrated and described herein also being specifically usable as a rear drawer slide bracket as will be hereinafter discussed. Initially referring to FIGS. 8 and 9, the preferred form of the bracket assembly is shown in an original flatwise condition as originally formed, preferably molded unitary from one of the usual plastics, such as polypropylene. Furthermore, the unitary bracket assembly includes a mounting member generally indicated at 38, a bracket member generally indicated at 40 and said clamping and bracket members integrally joined in this flatwise condition by a substantially flat, flexible strap member generally indicated at 42.

The mounting member 38 is formed with a forward outer surface 44 and a rearward clamping surface 46, the rearward clamping surface having a horizontally or longitudinally extending recess or groove 48 formed therein intermediate, preferably midway, transverse dimensions thereof and opening at the longitudinal extremities of the mounting member. Transverse extensions 50 are formed on the mounting member 38 extending upwardly and downwardly from the intermediately formed groove 48.

Furthermore, and opening 52 is formed completely through the mounting member 38 preferably transversely co-extensive with the groove 48 in the rearward clamping surface 46 and preferably midway of the longitudinal dimensions of the mounting member and the groove longitudinal extension. The opening 52 is, therefore, both transversely and longitudinally closed and encompassed by or totally within the rearward clamping surface groove 48 and is preferably rectangular in shape. Also, this results in the opening 52 being intermediate the longitudinal extension of the rearward clamping surface groove 48 so that the rearward clamping surface 46 borders the opening at opposite longitudinal sides of the opening within the groove, the transverse extensions 50 forming the transverse opening borders but without the rearward clamping surface groove.

A plurality of rearwardly projecting serrations 54 are formed extending transversely of the rearward clamping surface 46 within the groove 48 at the opposite sides of the opening 52, said serrations being equally longitudinally spaced.

Also, cylindrical fastener openings 56 are formed through the mounting member 38 spaced longitudinally from the sides of the opening 52 and substantially transversely midway of the groove 48. A rearwardly directed, hollow cylindrical collar or flange surrounds the fastener opening 56 at the side of the opening 52 opposite from the strap member 42 for a purpose to be hereinafter pointed out.

The bracket member 40 is substantially rectangular in front view as seen in FIG. 8 and is formed with a flat, rearward abutment surface 58, that is, rearward in final assembly, and a forward clamping surface 60, again forward in final assembly. A drawer slide engaging bracket 62 is integral on and projects forwardly from the forward clamping surface 60 longitudinally intermediate said clamping surface and it will be noted that the longitudinal dimensions of the bracket are spaced considerably less than the longitudinal dimensions of the mounting member opening 52, whereas the overall longitudinal dimensions of the bracket member 40 are approximately the same as those of the mounting member 38 and the overall transverse dimensions of the bracket member are approximately equal to the transverse dimensions of the groove 48 in the mounting member clamping surface 46, all for reasons to be hereinafter discussed. Spaced longitudinally at one side of the bracket 62, the bracket member 40 is formed with a longitudinally elongated fastener opening or slot 64 and at the opposite bracket side the enlarged, longitudinally elongated fastener opening or slot 66, the latter slot preferably opening longitudinally away from the bracket.

Completing the construction of the bracket member 40, groups of equally longitudinally spaced and transversely extending serrations 68 are formed on the bracket member clamping surface 60 except for the interruption by the fastener slots 64 and 66. The bracket member serrations 68 are equally longitudinally spaced and matching to the serrations 54 of the mounting member clamping surface 46 so that the mating serrations may be interengaged during assembly of the mounting and bracket members 38 and 40 into the final assembly as will be hereinafter described.

In assembly of this permanently secured form of the adjustable bracket assembly of the present invention, preparatory to final mounting and alignment, the mounting member 38 is turned longitudinally over reversely onto the bracket member 40 doubling the strap member 42 over onto itself due to the flexibility thereof. In the assembled position, therefore, as shown in FIGS. 5 and 6 and 7, the bracket 62 is received projecting forwardly through the mounting member opening 52 and the bracket member 40 is received within the groove 48 in the mounting member clamping surface 46. At the same time, the collar or flange at the one of the mounting member fastener openings 56 is received rearwardly through the bracket member enlarged fastener slot 66 while the other of the mounting member fastener openings 56 is aligned with the bracket member fastener slot 64. Finally, as thusly assembled, the mounting and bracket member clamping surfaces 46 and 60 are facing and the respective serrations 54 and 68 are ready for interengagement.

The partially assembled adjustable bracket assembly is then positioned against its appropriate vertical mounting surface 70 at an exact proper vertical level for proper vertical alignment of the bracket 62 on the bracket member 40 relative to a rear end of a desired drawer slide 72 to be supported. At the same time, the assembly is positioned in an approximate horizontally placed position aligned with the drawer slide 72, that is, the approximate proper horizontally placed position of the bracket 62 on the bracket member 40 relative to said drawer slide. To complete the mounting, the bracket member 40 is moved longitudinally or horizontally of the mounting member 38 into exact alignment with the exact intended location of the drawer slide 72 and fasteners 74 are secured through the various mounting and bracket member fastener openings and slots 56, 64 and 66, to tightly abut the mounting and bracket member clamping surfaces 46 and 60 interengaging the respective serrations 54 and 68, as well as forcing the bracket member abutment surface 48 rearwardly against the mounting surface 70 and the mounting member transverse extensions 50 rearwardly against said mounting surface.

This permanently secure form of the adjustable bracket assembly is, therefore, securely mounted on the mounting surface 70 with the bracket 62 of the bracket member 40 in exact aligned positioning with the rearward end of the drawer slide 72 and may receive such drawer slide telescoped thereover. Furthermore, due to the various abutments of the mounting and bracket members 38 and 40 with the mounting surface 70, the retention of the bracket member within the rearward clamping surface groove 46 of the mounting member and the unique interengagement of the mounting and bracket member serrations 54 and 68, such exact alignment of this form of the adjustable bracket assembly will be maintained over a long period of use and the danger of later slippage to unintended misalignments is completely eliminated. Still further, with this form of the overall bracket assembly formed unitary as described with the convenient assembly and adjustability thereof in this unitary form as permitted by the flexibility of the strap member 42, and the fact that the unitary assembly may be formed totally molded of plastic, this permanently secured form of the present invention is not only simple and relatively foolproof in assembly, but may be provided at a minimum of cost, despite the superior functioning thereof.

It is pointed out that although the unitary assembly form of the adjustable bracket assembly of the present invention is only illustrated in this latter permanently secured form just described, the previously described constantly floating form could likewise incorporate this unitary construction wherein the associated mounting and bracket members 10 and 12 of the constantly floating form could be molded integral and flatwise with a tying strap member, similar to the strap member 42 of this latter permanently secured form. Furthermore, incorporating such a strap member for providing a unitary assembly of the former constantly floating form clearly would not inhibit the intended floating characteristics thereof during support of the particular drawer slide 34, since the mounting and bracket members 10 and 12 when assembled and mounted on the mounting surface 32 would still be permitted to freely float by the flexibility of such a strap member.

At the same time, and according to the broader principles of the present invention, this latter described permanently secured form of the adjustable bracket assembly of the present invention could be formed with the mounting and bracket members 38 and 40 separate, eliminating the strap member 42 and the unitary feature of such assembly, all such alterations being clearly within the skill of those knowledgeable in the art.

According to the principles of the present invention, therefore, various embodiments of a novel adjustable bracket assembly usable as a rear drawer slide bracket and the like are provided, one form serving as a unique constantly floating form of adjustable bracket assembly, and another form serving as a unique permanently secured form of adjustable bracket assembly, with both including similar certain basic features not heretofore known. The constantly floating form of the adjustable bracket assembly of the present invention provides a constantly floating, but yet perfectly controlled, rear drawer slide bracket, while the assembly incorporating the same may be formed relatively simply and at a minimum expense. The permanently secure form of the adjustable bracket assembly of the present invention may likewise be relatively simply formed and at a minimum expense, yet various novel features are incorporated therein as hereinbefore described which assure that the rear drawer slide bracket thereof once adjusted will always remain in such adjusted position over a long period of useful life.

We claim:

1. In a bracket assembly for use as a rear drawer slide bracket and the like, the combination of: a bracket member having rearward surfaces adapted for slidable abutment with a mounting surface and forward surfaces having a bracket projecting forwardly from a part thereof; a mounting member having rearward and forward surfaces with an opening closed both longitudinally and transversely formed therethrough between said surfaces, said mounting member having a longitudinally extending groove formed in said rearward surfaces thereof including that portion of said rearward surfaces having said opening, said groove extending longitudinally in opposite longitudinal directions beyond said opening and spaced larger than said bracket member, said mounting member overlying said bracket member with said bracket member in said mounting member groove and with said bracket extending forwardly through said mounting member opening, said mounting member opening being of a longitudinal size larger than longitudinal dimensions of said bracket of said bracket member permitting relative longitudinal slidable positioning adjustment of said bracket member in said mounting member groove parallel to said mounting surface, transversely opposite longitudinally extending edge surfaces of said bracket member within said mounting member groove transversely slidably abutting transversely opposed groove peripheral surfaces of said mounting member guiding said bracket member in said slidable positioning adjustment, said bracket member being dimensioned longitudinally larger than said mounting member opening with the combination of mounting member surfaces within said groove longitudinally adjacent said opening and said mounting surface always forwardly and rearwardly confining said bracket member in said mounting member groove, portions of said mounting member extending at least oppositely transversely outwardly of said bracket member along and rearwardly abutting said mounting surface; means for securing at least said mounting member to said mounting surface.

2. A bracket assembly as defined in claim 1 in which said means for securing at least said mounting member includes fastener openings formed through each of said bracket and mounting members at longitudinally opposite sides of said mounting member opening for receiving fasteners clamping both said bracket and mounting members together and rearwardly against said mounting surface, the fastener openings of at least one of said bracket and mounting members being formed as longitudinally elongated slots.

3. A bracket assembly as defined in claim 1 in which a series of serrations are formed on parts of said bracket member forward surfaces interengaged with serrations formed on portions of said mounting member rearward surfaces inwardly of said mounting member groove, said serrations of said bracket and mounting members being interengaged in various positions of said relative longitudinal adjustment between said bracket and mounting members; and in which said means for securing at least said mounting member to said mounting surface secures at least said mounting member rearwardly with said serrations of said bracket and mounting members interengaged and said rearward surfaces of said bracket member in tight rearward clamping abutment with said mounting surface retaining said bracket member in stationary adjusted longitudinal position relative to said mounting member.

4. A bracket assembly as defined in claim 1 in which a series of serrations are formed on forward surfaces of said bracket member interengageable with a series of serrations formed on mounting member rearward surfaces within said mounting member longitudinally extending groove; and in which said means for securing at least said mounting member includes fastener openings formed through each of said bracket and mounting members at longitudinally opposite sides of said mounting member opening for receiving fasteners clamping both said bracket and mounting members together and rearwardly against said mounting surface, the fastener openings of at least one of said bracket and mounting members being formed as longitudinally elongated slots, said serrations of said bracket and mounting members being positioned interengaged in various positions of relative longitudinal adjustment between said bracket and mounting members for retaining said bracket member in a selected one of said various positions of said relative longitudinal adjustment upon said fastener openings receiving said fasteners clamping both said bracket and mounting members together and rearwardly against said mounting surface.

5. A bracket assembly as defined in claim 1 in which said means for securing at least said mounting member includes means on portions of said mounting member extending outwardly of said bracket member for securing said mounting member to said mounting surface, said bracket member being free of said means securing; and in which said bracket member is dimensioned relative to said mounting member groove at all times relatively freely longitudinally slidably adjustable along said mounting surface within said mounting member groove during said securing of said mounting member to said mounting surface by said means securing.

6. In a bracket assembly for use as a rear drawer slide bracket and the like the combination of: a unitary bracket assembly including a bracket member and a mounting member integrally longitudinally joined by a flexible longitudinally extending strap member; said bracket member having generally opposite normally rearward and normally forward surfaces with a bracket projecting from said normally forward surfaces; said mounting member having generally opposite normally rearward and normally forward surfaces with an opening spaced longitudinally larger than said bracket member bracket formed therethrough between said rearward and forward surfaces, a longitudinally extending groove formed in said mounting member rearward surface substantially encompassing said mounting member opening and of spaced larger longitudinal dimensions than said bracket member, said unitary assembly being originally positionable generally flatwise with said bracket member forward and said mounting member rearward surfaces facing in a common direction and said bracket member rearward and said mounting member forward surfaces facing in an opposite common direction and with said flexible strap member extending longitudinally generally flatwise therebetween; and said unitary assembly being positionable finally mounted with said mounting member reversely overlying said bracket member receiving said bracket member within said mounting member groove and said flexible strap member doubled back upon itself extending therebetween, said assembly in said finally mounted position having said bracket member forward and said mounting member rearward surfaces positioned facing within said bracket member groove and said bracket of said bracket member projecting forwardly through said mounting member opening and with said bracket member rearward surfaces positioned facing a mounting surface upon which said assembly is mounted, said flexible strap member at least during placing of said assembly in said finally mounted position permitting longitudinal adjustment movement of said bracket member within said mounting member groove, said mounting member having at least transversely extending portions rearwardly abutting said mounting surface upon which said assembly is mounted in said finally mounted position of said assembly.

7. A bracket assembly as defined in claim 6 in which a plurality of generally transversely extending serrations are formed on said bracket member forward surfaces and on said mounting member rearward surfaces within said mounting member groove, said serrations of said bracket and mounting members being interengaged in all positions of said relative positioning adjustment as permitted by said flexible strap member when said unitary assembly is in said finally mounted position and said mounting member is clamped rearwardly against said bracket member forcing said bracket member rearwardly against mounting surface; and in which fastener openings are formed through said bracket and mounting members, said fastener openings of each of said bracket and mounting members being aligned and at longitudinally opposite sides of said mounting member bracket opening when said unitary assembly is in said finally mounted position, said fastener openings of at least one of said bracket and mounting members being formed as longitudinally elongated openings permitting said relative positioning adjustment when fasteners are positioned through said fastener openings.

* * * * *